Jan. 22, 1963  V. E. PEEK  3,075,166
HOT LINE CLAMP
Filed Sept. 8, 1959  3 Sheets-Sheet 1
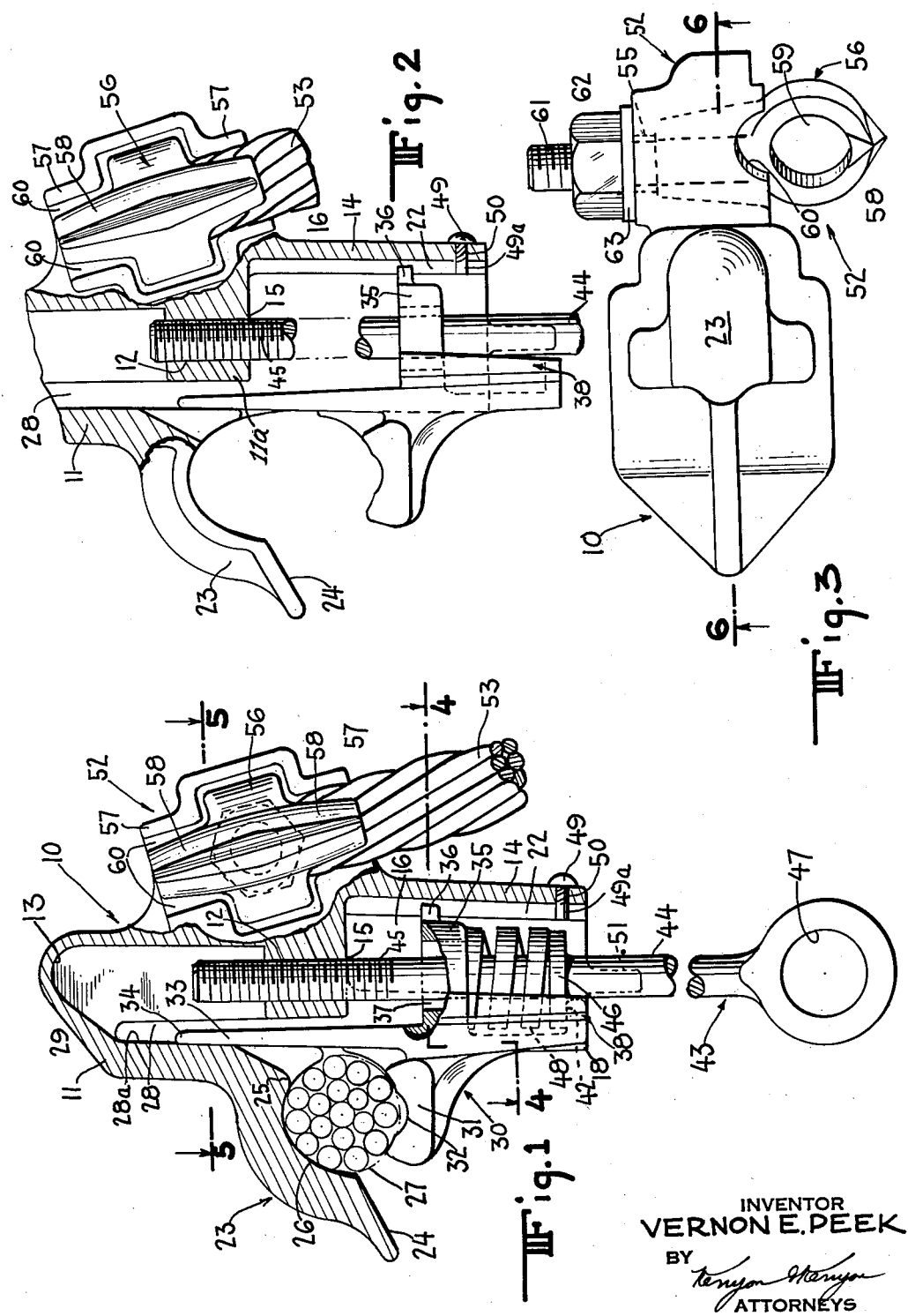
INVENTOR
VERNON E. PEEK
BY
*Kenyon & Kenyon*
ATTORNEYS Jan. 22, 1963     V. E. PEEK     3,075,166
HOT LINE CLAMP Filed Sept. 8, 1959     3 Sheets-Sheet 2

INVENTOR
VERNON E. PEEK
BY
Kenyon & Kenyon
ATTORNEYS

Jan. 22, 1963    V. E. PEEK    3,075,166
HOT LINE CLAMP

Filed Sept. 8, 1959    3 Sheets-Sheet 3

INVENTOR
VERNON E. PEEK
BY
Kenyon & Kenyon
ATTORNEYS

United States Patent Office 3,075,166
Patented Jan. 22, 1963

3,075,166
HOT LINE CLAMP
Vernon E. Peek, Tarrant City, Ala., assignor to Anderson Electric Corporation, Birmingham, Ala., a corporation of Alabama
Filed Sept. 8, 1959, Ser. No. 838,616
4 Claims. (Cl. 339—109)

This invention relates to electrical wire clamps, and more particularly, to an electrical clamp or connector which is especially adapted for use in making a temporary or permanent connection of a branch line to a "hot" or live wire power transmission or distribution line.

It is a common practice in the electrical art to utilize detachable clamps for making quick temporary or shiftable connections to a main power line which is hot, i.e., one in which there is voltage on the line. This connection is for the purpose of interconnecting wires from various types of equipment to the power line circuit, e.g., from transformers or other types of electrical equipment used by linemen during their maintenance work. Each of the quick attachable or detachable clamps with a branch or tap line secured to it, is mounted on the hot main line and clamped to the latter usually by means of a long insulated pole or similar device having a suitable holding means on one of its ends. In mounting the clamp it is hooked onto the power line and then by appropriate manipulation of the insulated pole the fastening means of the clamp is actuated so as to securely clamp the conductor to the main power line.

Basic requirements for these so-called hot line clamps are that they be quickly and easily securable to and removable from the live power line. They also should be of sturdy construction and have a minimum of operating parts. In addition, they should maintain their clamping pressure on the power line under all conditions of use without any tendency toward relaxation or disconnection even under the most adverse environmental or other situations. An additional requirement is that the clamps be constructed of non-corrosive metal and at the same time have low electrical resistance.

Among the main difficulties encountered in prior clamps, intended for use in the manner just described, have been the effects of exposure to the atmospheric environment. Rain, sleet and snow as well as industrial contamination and corrosive fumes over extended periods of exposure have been found to corrode and deteriorate the components of the clamp. Consequently, it frequently is difficult to remove the clamp from a line to which it has been attached, since the corroded parts stick to each other as well as to the power conductor. Attempted removal often causes breaking of the clamp and parts thereof may even remain adherent to the main hot line. These clinging parts not only are difficult to remove, but present hazards to the workmen who attempt to remove them. Usually, the parts of the clamp most vulnerable to deterioration are screw threaded or spring components thereof, and their deterioration or destruction is a cause of malfunction and hazard as above described.

In addition to the deteriorating effects of atmospheric conditions, electrical arcing, particularly with high tension lines, has also been found to accelerate deterioration of the mentioned components of the clamp.

In addition, in prior clamps known in the art, it has been found difficult to maintain adequate clamping pressure on the hot line. As a result, such clamps have been found to work loose, either because of vibration or radial contraction of the line, with ambient changes in temperature thereof. Moreover, many of these clamps have been found to cause damage to the line to which they are attached by reason, among others, of a skewing or twisting action of the movable jaws of such clamps, as they are advanced toward the stationary jaws for clamping purposes. This action can be sufficiently marked to materially damage the conductor to which the clamp is attached at the point of application with resultant danger of power line breakage and consequent power failure and of hazard to life from broken hot lines on the ground.

Principal objects and features of the present invention are to provide a hot line clamp construction which will provide effective clamping of the main conductor under all conditions however adverse, and reduce the effects of relaxation to a minimum.

Further objects and features of the invention are to provide a hot line clamp construction in which the distribution of forces effecting the movement of the movable jaw are such as to prevent skewing or twisting action thereof during tightening of the clamp.

Additional objects and features of the invention are to provide a hot line clamp construction whose most delicate components are protected from the effects of adverse atmospheric conditions as well as from the effects of electrical arcing.

Additional objects and features of the invention are to provide a hot line clamp construction in which wearing tendencies on operating parts, as a result of skewing or twisting tendencies of the movable jaw during tightening, are eliminated.

Further objects and features of the invention are the provision of a hot line clamp that may be manipulated with conventional hot line clamp manipulating poles, presently extant.

Still further objects and features of the invention collectively, are: the provision of a hot line clamp for providing good contacts between the clamp and any conductor to which it is connected; the provision of a direct flow of current from the main conductor to the tap conductor; the provision of a clamp in which the branch conductor does not lie above the main conductor to which the clamp is attached; the provision of a hot line clamp whose movable jaw is operated by a bolt and which includes means to prevent binding side thrust on the bolt; the provision of a clamp in which the jaws are shaped especially to effect automatic scouring of oxides from the main line conductor during tightening of the clamp and thus provide improved electrical contact with the conductor; the provision of a clamp in which the movable jaw is subject to relatively heavy duty spring action to reduce the effects of vibration and resultant loss of clamping pressure; the provision of a clamp including means to prevent its disassembly which means preferably will not interfere with the regular operation of the clamp; the provision of means in which the movable jaw is positively activated by rotation of the operating bolt, both in clamping and unclamping directions; and the provision of a clamp in which the movable parts may be coated with lubricant without ready access to the latter of water which could wash out such lubricant or of electrical arcs which could ignite the lubricant or cause its deterioration.

Other objects and features of the invention will become apparent from the following specification and accompanying drawings forming a part hereof and wherein:

FIG. 1 is a partially sectionalized elevational view of a clamp embodying the invention;

FIG. 2 is a similar view with parts in different positions;

FIG. 3 is a plan view of the clamp;

Figure 4:
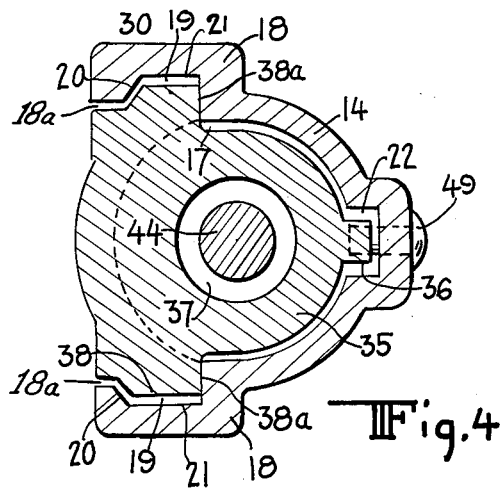
FIG. 4 is a cross-sectional view taken along line 4—4 of FIG. 1.
Figure 5:
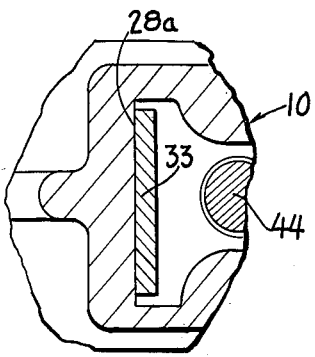
FIG. 5 is a fragmentary section taken along line 5—5 of FIG. 1.
Figure 7:
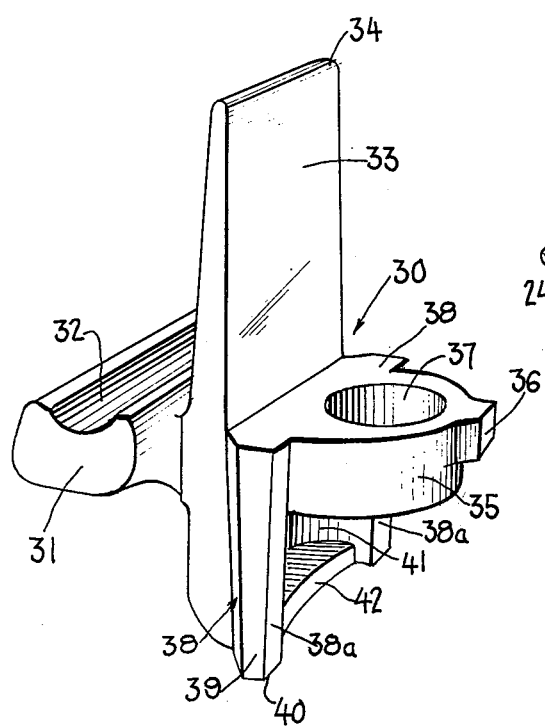
FIG. 7 is a perspective view of the keeper and movable jaw means of the clamp.

Referring to the drawings the reference character 10 denotes generally a clamp embodying the invention. The body portion 11 thereof has a threaded bore 12 extending longitudinally in the body portion 11 and terminating in a closed inner end 13. A tubular skirt portion 14 arranged substantially concentrically with respect to the bore 12 extends outwardly of its open end 15 defining a cavity 16. A longitudinally extending opening 17 (FIG. 4) is provided in a side of the skirt portion. Flanges 18 integral with the skirt portion 14 extend parallelly longitudinally along the opposite edges of said side opening 17. Longitudinally disposed, parallel, facing grooves 19 are provided at opposite locations in the respective flanges 18. These grooves 19 each have a side wall 20 obliquely disposed relative to their innermost walls 21. A longitudinal guide groove or keyway 22 is provided in the wall of skirt portion 14, preferably diametrically opposite to the opening 17.

A laterally extending fixed jaw 23 preferably integral with the body portion 11 projects outwardly of said body portion above the skirt opening 17 and includes an angular nose portion 24. The underside 25 of this fixed jaw 23 as viewed in FIGS. 1, 2 and 6 has a semi-elliptically-shaped portion 26 which is adapted to receive an electrical cable or conductor 27 as shown. Also, as viewed in FIG. 8 the underside 25 of this fixed jaw is concave longitudinally of the axis of the cable, or conductor 27, the concavity having a major fixed depth point $y$ located at a preferably central location relative to the opposite ends $a$ and $b$ of said jaw 23 at a height of $1Y$ for purposes presently to be described.

A guide chamber 28 is provided within the body portion 11. This chamber 28 extends longitudinally substantially parallel with bore 12 tapering inwardly toward its closed end 29, and lying between said fixed jaw 23 and said bore 12 above the skirt 14.

Figure 6:
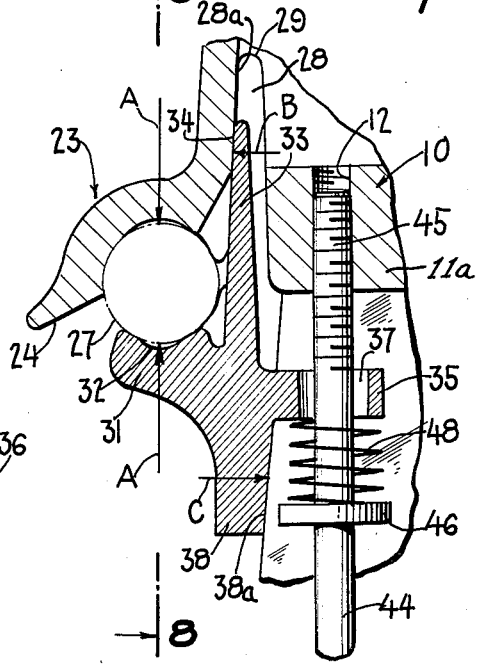
FIG. 6 is a fragmentary vertical section of the clamp taken along line 6—6 of FIG. 3.
Figure 8:
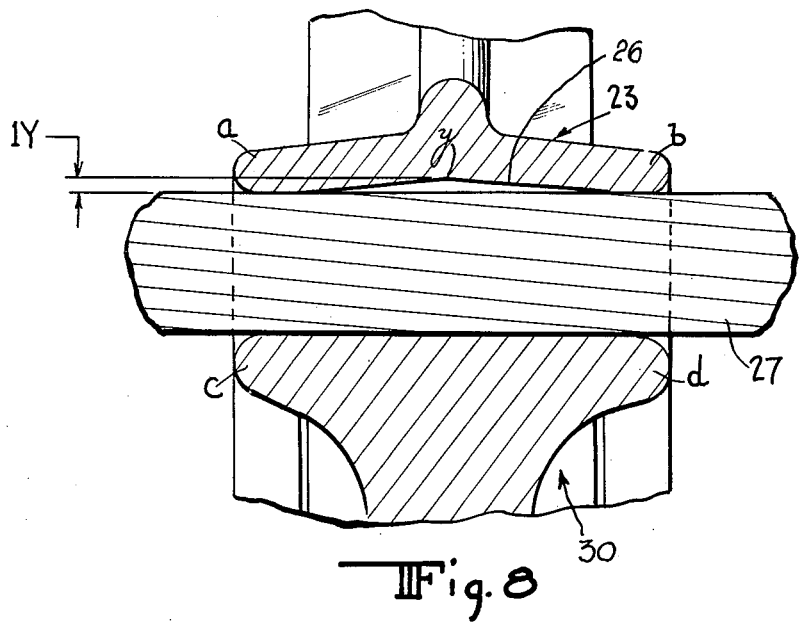
FIG. 8 is a fragmentary sectional view taken along line 8—8 of FIG. 6 illustrating details of construction particularly of the fixed body or stationary jaw in its initial state prior to application of rated torque to the movable keeper jaw.

A movable keeper 30 includes a jaw 31 movable with said keeper toward and away from the stationary jaw 23 is provided. A semi-elliptical groove 32 as seen in FIGS. 1, 2 and 6 is provided in the jaw 31 which latter is adapted to underlie the conductor 27 when the keeper is positioned in body portion 11. The semi-elliptical shapes of jaw surfaces 26 and 32 enhance maintenance of clamping pressure on the conductor 27 without deformation of the latter. They also facilitate scraping of oxides from the surface of the conductor 27 clamped between them and thus improve electrical contact therewith. As seen in FIG. 8, the keeper jaw surface 32 in the longitudinal direction between its ends $c$ and $d$ is substantially straight throughout its length and parallel with the axis of conductor 27.

A tongue-like, tapered guide rail 33 is an integral part of keeper 30. This tongue-like rail 33 is movable slidably within the chamber 28 during movement of jaw 31 toward and away from fixed jaw 23. Its length is dimensioned so that a portion adjacent its outermost end 34 still will lie within the chamber 28 engaged with its front wall 28a even at widest separation between the jaws 23 and 31. The length of chamber 28 is sufficient to permit movement of the keeper 30 so as to bring jaw 31 into actual engagement with fixed jaw 23 if desired.

A keeper pressure member 35 integral with the keeper 30 is offset laterally of the tongue-like rail 33 extending in opposite direction to the jaw 31 into chamber 16. This pressure member 35 has generally cylindrical shape and is dimensioned to move slidably within the chamber 16 of the skirt portion 14. A key or tongue 36 extends outwardly of member 35 and is adapted to be movable slidably in the keyway 22 for purposes presently to be described. A hole 37 is provided in member 35. Oppositely located side rails 38 preferably integral with the keeper 30 have contours complemental substantially with the contours of the grooves 19 of skirt flanges 18. These rails 38 are intended to be movable slidably in said grooves 19 when the keeper 30 is assembled with the body portion 11. As shown, the side portions 39 of these side rails 38 are tapered toward their lower ends 40.

A partially cylindrical recess 41 is provided in the wall of the keeper 30 below hole 37 and a transverse ledge or flange 42 spans a portion of this recess near its outer end.

An eyebolt 43 having an eye stem 44 and a threaded portion 45 on the stem adjacent one end, that may be screwed into the threaded bore 12 is provided. An annular shoulder 46 is provided on stem 44. An eye head 47 is provided at the other end of stem 44. A compressible spring 48 is mounted on the stem 44 with one of its ends abutting the shoulder 46 and its other end abutting the lower face of pressure member 35 when the stem 44 is passed through hole 37 and has its threaded end 45 screwed into the bore 12. At this time, too, the lower face of shoulder 46 engages the ledge or flange 42. Axial movement of eye stem 44 during screwing rotation then causes corresponding positive sliding movement of keeper 30 and its jaw 31 toward or away from the fixed jaw 23 depending upon direction of rotation of the stem.

After the parts have been assembled as just described, a pin or drive screw 49 is pressed into an opening 50 located in the wall of skirt portion 14 near the lower or outermost end of the keyway 22. The inwardly projecting portion 49a of pin 49 lies within said keyway 22 and serves as an abutment that limits outward movement of keeper body 30 by acting as a limit stop for the key 36. This prevents accidental disassembly of the assembled parts.

Projections 51 are provided at diametrically opposite points at the bottom or outward end of skirt portion 14. These serve in conventional ways as locking and unlocking means for an insulated pole mechanical clamp stick (not shown). The movable jaw 31 is adjustable toward and away from the stationary jaw 23 by rotary movement of the eye head 47 at the outer end of eye stem 44 in appropriate screwing direction. This rotation may be effected manually as well as by the manipulation of the insulated pole mechanical clamp stick.

Integrally formed with the body portion 11 of the clamp 10 is a connector means 52 for attachment of a tap-off or branch line 53. This connector means 52 comprises a receiver portion 54 having a bore 55 adapted to receive an eye bolt 56. The receiver portion 54 has a pair of spaced projections 57 adapted to underlie the elongated flanges 58 of eyebolt 56. The branch line or conductor 53 extends through the receiving hole 59 in eyebolt 56 and is gripped between the elongated flanges 58 and the respective grooved channels 60 provided in the projections 57 on receiver portion 54. A threaded portion 61 is provided on the eyebolt 56. This portion 61 extends through the bore 55 and is threadedly engaged by a nut 62 for tightening the latter against washer 63 to secure the eyebolt 56 and to clamp branch line 53 in place.

The clamp 10 is or can be adapted for use with various types of insulated poles or clamping sticks including the kind having a sliding hand grip which actuates a clamp and ferrule type locking and unlocking means on the upper end of the pole.

Figure 9:
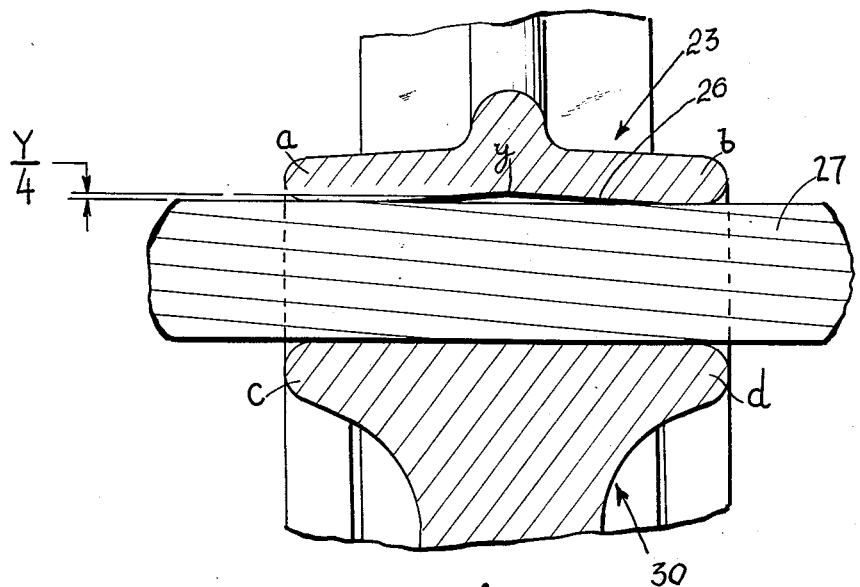
FIG. 9 is the same sectional view after rated torque has been applied by the keeper or movable jaw.

In operation of clamp 10, it may be used as follows: The branch line 53 is first secured to the connector means 52 by insertion thereof through the channels 60 in the receiver portion 54 and also through the receiving hole 59 of eyebolt 56. Then nut 62 is tightened against washer 63 until the eyebolt 56 and branch line 53 are tightly anchored in place. Then the adjacent eyebolt 43 is rotated by rotation of its eyehead 47 to move jaw 31 away from fixed jaw 23 so that sufficient space exists therebetween to permit free entry of a hot line conductor 27. The clamp 10 is then engaged with the holding mechanism of the elongated pole or other conventional insulated tightening tool (not shown) and the hook-line stationary jaw 23 is mounted over the conductor 27 so that the latter is received within the gripping surface 26 as shown in FIG. 1. Then the eye 47 is rotated in a direction to cause stem 44 to move inwardly of body bore 12 and thereby cause movable jaw 31 to move so that its gripping surface 32 engages the conductor 27 in the position as shown in FIG. 8. At this time the highest point of the concavity defined in the underside surface 25 of fixed jaw 23 as seen in FIG. 8 is 1Y above the surface of the conductor 27. The eye 46 is further rotated against the bias of spring 48 until desired clamping pressure on conductor 27 between the two jaws 23 and 31 is achieved. During such adjustment the depth of the concavity is reduced because of flexing of the oppositely extending branches a and b of said surface jaw 23. When rated tightening torque has been effected by this adjustment the flexure reduces the height of the y point of the concavity to ¼Y approximately as seen in FIG. 9.

The metallic material of the body portion 11 of clamp 10 possesses some built-in or inherent elasticity. When pressure is applied from the keeper jaw 31 against the conductor 27 to the stationary body jaw 23, to the extent of rated torque, the concavity in jaw 23 permits flexure of the wings a and b of jaw 23 so that the deepest point y thereof is shifted from a distance 1Y away from the conductor to a distance approximately ¼Y from the conductor. (See FIGS. 8 and 9.) In other words, elastic deformation of the wings a and b of jaw 23 occurs and the groove surface 26 then over the major portion of its length then makes substantially uniform smooth contact with conductor 27. Now, if a relaxation of pressure on the conductor should occur as caused by creep or other phenomena, the elastically deformed ends or wings a and b of jaw 23 provide a built-in or inherent spring action that compensates automatically for what would otherwise have caused a loss of contact pressure on the conductor 27.

In such adjustment too, it is to be noted that the clamping pressure is transmitted from the stem 44 in a direct straight line parallel with the axis of stem 44 in a plane A—A (FIG. 6) parallel with said axis and passing centrally through the center of gripping surface 32, through the axis of conductor 27 and through the gripping surface 26 of fixed jaw 23. This plane A—A does not shift during tightening nor does any skew or relative rotary shift of the jaws 23 and 31 occur because the outwardly facing surface of guide tongue 33 abuts wall 28a of chamber 28 with a force directed in the direction of arrow B, while the inner wall portions 38a of guide rails 38 abut the innermost walls of guide grooves 19 with a force in the direction of arrow C while tightening occurs. The abutments oppose these forces B and C and thereby prevent any turning or twisting couples from skewing or rotating movable jaw 31. Thus damage to the conductor 27 during tightening is avoided and wear is reduced. No binding of the stem will occur.

The wide tongue 33 also serves as a protective apron which prevents access of arcing sparks or gases directly to the chamber 16 and to the bolt 44 and its threaded portion 45, or to the threaded bore 12 in body 11. Likewise, the lower portion of keeper 30 lying between its rails 38 serves as a protective apron for the spring 48 by substantially closing off the opening 17 in the skirt portion 14.

The internal parts protected by these aprons may be oil coated for further protection without danger of oil ignition due to arcing as the arc sparks are prevented by the aprons from reaching any oiled parts. The aprons also minimize, if not entirely eliminate, entry of rain, sleet, ice or snow into the movable parts within the clamp to dilute the oil or freeze the parts together.

The entire device described, exclusive of helical spring 48 and pin 49 may be cast from suitable material such as aluminum, or bronze alloys which provide good electrical properties as well as strength.

The bias supplied by spring 48 as well as that supplied by the elastic deformation of branches a and b of jaw 23 compensate for vibratory motion of conductor 27 or its contraction or expansion or relaxation tendencies during use, so that the necessary and desirable clamping pressure, on the conductor 27 is maintained at all times.

From the above, it will appear that applicant's hot line clamp 10 essentially comprises the elongate body 11 having the stationary jaw 23 extending laterally outward from one side thereof (its left side as viewed in FIGS. 1, 2 and 6) adapted to be hooked over electrical conductor 27, the body then hanging generally vertically on the conductor. The lower portion 14 of the elongate body 11 is of channel shape in transverse cross section (see FIG. 4), open at its lower end and at the stated one side of the body (its left side as viewed in FIGS. 1, 2, 4 and 6) thereby providing a slot designated 18a (between the flanges 18) at this side of the body. Keeper 30 is slidable longitudinally in the channel-shaped lower portion 14 of the body 11 without rotation relative to the body, these parts having cooperating guide surfaces (as at 38a, and on between rails 38 and flanges 18, and on key 36 and in keyway 22) guiding the keeper for longitudinal sliding movement in portion 14 and holding it against rotation therein. Movable jaw 31 is provided on that side of the keeper in slot 18a and is cooperable with the stationary jaw 23 for clamping electrical conductor 27 therebetween. Body 11 has above the keeper the portion 11a (see FIGS. 1, 2 and 6) which extends from the right side of the body as viewed in FIGS. 1 and 2 at the upper end of the lower portion 14 of the body toward the open side of portion 14 but terminating short of slot 18a. This portion 11a has the screw-threaded bore 12 provided therein, the bore extending lengthwise of the body. Body 11 also has the chamber or recess 28 located between the bored portion 11a and the stationary jaw 23. This recess 28 opens downwardly toward the slot 18a, and has the generally flat portion or side 28a located toward the stated one side of body 11. The rail or tongue 33 projects upwardly from keeper 30 extending lengthwise of slot 18a and reaching into the recess 28, the outside face of this tongue 33 being in slidable contact with side 28a of the recess. Tongue 33 has a width corresponding substantially to the width of slot 18a and substantially closes the slot. Recess 28 is dimensioned for loose sliding fit of the tongue 33 (see particularly FIG. 6). Bolt 43 is threaded at its upper end in bore 12, the portion of the bolt in the bore being completely surrounded by the walls of the bore, and this bolt extends downwardly out of the lower end of the body 11 where it has the eye 47 which serves as means for application of a tool, such as a hot line stick, to turn the bolt. The bolt is interconnected with keeper 30 via shoulder 46 on the bolt engageable with the ledge 42 on the keeper and spring 48 engaging part 35 of the keeper for effecting sliding of the keeper lengthwise of the body 11 on turning the bolt.

Although a specific embodiment of the invention has been disclosed, variations in structural detail within the scope of the appended claims are possible and are contemplated. There is no intention, therefore, of limitation to the exact disclosure herein made.

What is claimed is:

1. An electrical hot line clamp comprising a body portion, a stationary jaw thereon, said body portion having a threaded bore and a guide chamber extending inwardly from said stationary jaw, a skirt portion extending from the body portion, said skirt portion having a side opening extending in substantial parallelism with the axis of said threaded bore and said side opening also having guiding grooves at its opposite sides, a keeper, an extension on said keeper movable in said guide chamber and an oppositely disposed portion on said keeper having side rails movable in said guiding grooves, a jaw on said keeper movable toward and away from said stationary jaw, a threaded stem member screwable into said bore, and means for coupling said stem member to said keeper for effecting longitudinal movement of the latter and corresponding movement therewith of said movable jaw, said last-named means including a resilient member to permit limited yielding of said movable jaw away from the stationary jaw when a conductor is clamped between the jaws in response to forces exerted by the conductor while clamped between the jaws, said extension and said oppositely disposed portion being interposed between said coupling means and said jaws, whereby said coupling means is enclosed within said body portion and shielded from said jaws, and connector means on said body portion for connecting a branch conductor thereto.

2. An electrical hot line clamp comprising a body portion having a stationary jaw thereon and having an internally threaded bore, a guide chamber adjacent said bore, a skirt portion extending outwardly of the body, said skirt portion having an internal longitudinal keyway therein, a side opening and guiding grooves facing each other along opposite sides of said side opening, a keeper having a tongue member thereon slidably disposed within said guide chamber and oppositely disposed side rails movable slidably in respective guiding grooves, a jaw on said keeper aligned with said fixed jaw and movable with said keeper along a guided straight path toward and away from said fixed jaw, a keeper pressure member lying within said skirt portion, having a protuberance therein received by said keyway, a threaded stem member passing through said pressure member and threaded into said bore portion for axial movement in a direction determined by the direction of rotation of said threaded stem member, said keeper enclosing said bore and said threaded stem member within said body, means for transmitting this axial movement to said keeper to effect corresponding directional motion of its jaw, and means for connecting a branch conductor to said body portion.

3. An electrical hot line clamp comprising a body portion having a stationary jaw thereon and having a guide chamber adjacent said jaw, a skirt portion extending outwardly of the body, said skirt portion having an internal longitudinal keyway therein, a side opening extending lengthwise of said skirt portion and guiding grooves facing each other along opposite sides of said side opening, a keeper having an extension disposed outwardly therefrom being slidably movable within said guide chamber and a pair of spaced side rails on said keeper oppositely disposed from said extension movable slidably in respective guiding grooves, a lateral jaw on said keeper aligned with said fixed jaw and movable with said keeper along a guided straight path toward and away from said fixed jaw, a keeper pressure member lying within said skirt portion having a protuberance thereon received by said keyway, means for transmitting axial movement to said keeper to effect corresponding directional motion of its jaw, the latter said means being shielded from said jaws by said keeper, and means for connecting a branch conductor to said body portion.

4. A hot line clamp comprising an elongate body, a stationary jaw on said body extending laterally outward from one side of said body intermediate its ends adapted to be hooked over an electrical conductor, the body then hanging generally vertically on the conductor, the lower portion of said body below said stationary jaw being of channel shape in transverse cross section open at its lower end and at said one side of the body thereby providing a slot extending down from said stationary jaw at said one side of the body, a keeper slidable longitudinally in said channel-shaped lower portion of said body without rotation relative to said body, said keeper and said channel-shaped lower portion of said body having cooperating guide surfaces guiding said keeper for longitudinal sliding movement in said channel-shaped lower portion of said body and holding said keeper against rotation therein, a jaw on the side of said keeper in the slot cooperable with said stationary jaw for clamping an electrical conductor therebetween, said body having above said keeper a portion provided with a screw threaded bore extending lengthwise of said body and a recess located between said bored portion and said stationary jaw and opening downwardly toward said slot, said recess having a generally flat side located toward said one side of the body, a tongue projecting upwardly from said keeper extending lengthwise of said slot and reaching into said recess, the outside face of said tongue being in sliding contact with said flat side of said recess, said tongue having a width corresponding substantially to the width of said slot and substantially closing said slot, said recess being dimensioned for loose sliding fit of the tongue therein, and a bolt threaded in said bore and completely surrounded by the walls thereof extending downwardly out of the lower end of said body and interconnected with said keeper for effecting sliding of the keeper lengthwise of said body on turning the bolt, and means at the lower end of the bolt for application of a tool to turn the bolt, said body being completely closed at its upper end.

References Cited in the file of this patent

UNITED STATES PATENTS

| | | |
|---|---|---|
| 1,950,771 | Becker | Mar. 13, 1934 |
| 1,984,566 | Bodendieck | Dec. 18, 1934 |
| 2,574,776 | Clapp | Nov. 13, 1951 |
| 2,738,480 | Hubbard | Mar. 13, 1956 |
| 2,780,793 | Gamble | Feb. 5, 1957 |
| 2,858,522 | Wengen et al. | Oct. 28, 1958 |
| 2,867,787 | Nilsson | Jan. 6, 1959 |